United States Patent [19]

Rohde

[11] 3,972,415
[45] Aug. 3, 1976

[54] DRAG-CHAIN CONVEYOR CONSTRUCTION

[75] Inventor: Wolfgang Rohde, Essen, Germany

[73] Assignee: Bergwerksverband GmbH, Essen, Germany

[22] Filed: Aug. 6, 1974

[21] Appl. No.: 494,953

[30] Foreign Application Priority Data

Aug. 8, 1973 Germany.................... 7328985[U]

[52] U.S. Cl. ............................... 198/205; 49/485
[51] Int. Cl.² ....................................... B65G 15/60
[58] Field of Search .............. 198/43, 46, 50, 65, 198/66, 83, 205; 222/371; 49/485

[56] References Cited
UNITED STATES PATENTS

| | | | |
|---|---|---|---|
| 2,311,747 | 2/1943 | Gooch | 198/66 |
| 2,459,120 | 1/1949 | Spraragen | 49/485 |
| 2,593,965 | 4/1952 | Blackwell | 198/66 |
| 3,042,360 | 7/1962 | Sneddon | 198/65 |
| 3,351,180 | 11/1967 | Herzog et al. | 198/205 |

FOREIGN PATENTS OR APPLICATIONS

| | | | |
|---|---|---|---|
| 1,065,779 | 3/1958 | Germany | 198/205 |

*Primary Examiner*—Evon C. Blunk
*Assistant Examiner*—Joseph E. Valenza
*Attorney, Agent, or Firm*—Michael J. Striker

[57] ABSTRACT

A drag-chain conveyor has a trough-shaped elongated passage a bottom wall of which is formed with one or more openings each bounded by a circumferentially extending marginal wall portion of stepped cross-section. A discharge chute is provided for each opening and extends downwardly from the bottom wall. A closure plate is provided for each opening and each plate is movable between a position in which it is withdrawn from the respective opening and a position in which it is located and closes the opening. The closure plate has a circumferentially extending bevelled edge face which sealingly engages the wall portion bounding the respective opening when the closure plate is in its closing position. A mounting arrangement mounts the closure plate for movement between the positions thereof.

7 Claims, 4 Drawing Figures

DRAG-CHAIN CONVEYOR CONSTRUCTION

BACKGROUND OF THE INVENTION

The present invention relates generally to a conveyor, and more particularly to a drag-chain conveyor. Still more particularly, the present invention relates to a drag-chain conveyor provided with an arrangement for gas-tightly and dust-tightly sealing the outlet openings of the conveyor passage.

Drag-chain conveyors are widely used in connection with batteries of industrial furnaces, such as coking ovens and the like, to supply the coal or coke in cold or pre-heated condition to the respective oven chambers, into which they are then admitted as a charge. Such ovens, when arranged in form of a battery, are located side-by-side so that the battery is elongated. The drag-chain conveyor is usually mounted approximately 5 or 6 meters above the upper ceiling of the battery of ovens, and above each oven chamber the bottom wall of the passage or duct in which the dragchain of the conveyor advances, is provided with an opening from which a usually funnel-shaped chute extends downwardly. The chute can be closed with a slidable closure plate and, when the latter is opened, coal or coke which is advanced along the passage by the drag-chain of the conveyor, can fall out of the opening and through the chute into a charging larry or the like which is positioned beneath the chute and which usually travels on rails thart are mounted on the upper ceiling of the battery of furnace chambers. This larry or other equivalent device then transports the charge of coal or coke to the charging hole of the respective oven chamber and admits the coal or coke into this charging hole.

These prior-art arrangements have a significant disadvantage. They operate well when coal or coke is to be admitted into that discharge opening and chute that is associated with the oven chamber located at the inlet end of the drag-chain conveyor, that is at the end where the conveyor is being fed with coal or coke which it then advances by the drag action of its chain links. If, however, coal or coke is to be introduced into the second or any following opening, then all openings preceding the one which it is intended to fill with coal or coke, will similarly receive a charge of coal or coke. This means that the funnel-shaped chutes of each of these openings become filled with the coal or coke since these chutes are normally closed by their respectively associated closure plate which is of course opened only when the coal or coke is to be discharged from the chute into a larry or similar device located beneath the latter. In the region where these chutes are unintentionally filled with coal or coke, the conveying action of the drag-chain conveyor is significantly impaired because the coal being advanced by the conveyor must now slide over the coal which fills the respective chute. The increased friction requires increased force to be able to advance the drag chain of the conveyor. This, however, has the disadvantage that the links of the drag chain are subjected to substantially increased wear. If the coal or coke is preheated before it is fed to the conveyor, then those quantities of coal which accumulate in the discharge chutes from which they are not immediately to be discharged, will cool and tend to cake together. When this takes place, a later opening of the closure plate will not result in discharging of the contents of the respective chute, because the contents have caked together into a solid mass.

Moreover, the prior-art conveyors of this type, which have their slidable closure plates located within the chute so that the latter can fill up above the respective closure plate, do not provide for a dust-tight and gas-tight sealing of the chute, which is disadvantageous in terms of contamination of the ambient atmosphere.

SUMMARY OF THE INVENTION

It is, accordingly, an object of the present invention to overcome the disadvantages of the prior art.

More particularly, it is an object of the present invention to provide an improved drag-chain conveyor which is not possessed of these disadvantages.

Particularly, it is an object of the invention to provide such an improved drag-chain conveyor in which the conveying action of the conveyor is not disadvantageously influenced in the manner known from the prior art, and in which the wear on the links of the conveyor is significantly reduced.

Another object of the invention is to provide such a conveyor in which the closure plates for the respective discharge chutes provide a dust-tight and gas-tight seal.

In keeping with these objects, and with others which will become apparent hereafter, one feature of the invention resides, in a drag-chain conveyor, in a combination which comprises wall means defining an elongated passage having a bottom wall formed with an opening which is bounded by a circumferentially extending marginal wall portion of stepped cross-section. A discharge chute extends downwardly from the bottom wall and communicates with the opening. A closure plate is provided for the opening and is movable between a first position in which it is withdrawn from the opening and a second position in which it is located in and closes the opening. The closure plate has a circumferentially extending bevelled edge face which sealingly engages the marginal wall portion bounding the opening when the closure plate is in its second position. Mounting means mounts the closure plate for movement between the first and second positions thereof.

According to a further concept of the invention, one or both of the contacting faces on the opening and the closure plate may be provided with an elastic sealing strip, which can be asbestos with plastic surface or plastic for instance PTFE or metallic of a springy characteristic, textile fabric.

The mounting means which mounts the closure plate for movement between its positions advantageously utilizes a simple lever system with a crank, the plate being so mounted on the lever system that precisely dimensioned abutments are provided which permit the closure plate to tilt very slightly with reference to the lever system when the closure plate is in its closure position, but which tilting is only of such magnitude as to permit the closure plate to assume its proper closing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
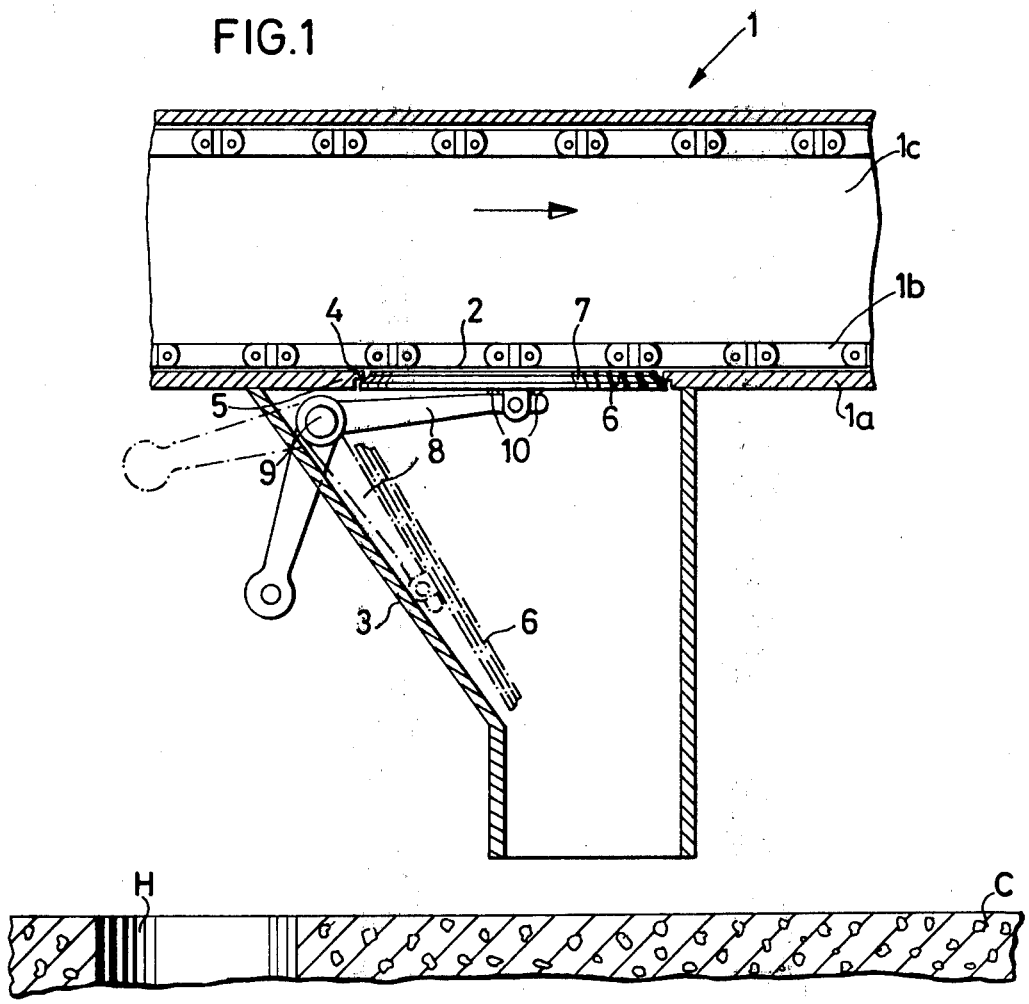
FIG. 1 is a fragmentary vertical longitudinal section through a drag-chain conveyor according to the present invention, also showing a fragment of the ceiling of an oven battery which is to be serviced by the drag chain conveyor.
Figure 2A:
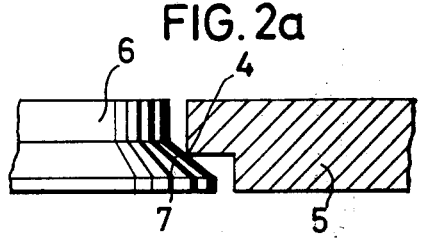
FIG. 2A is an enlarged fragmentary detail view, showing a detail of FIG. 1.
Figure 3:
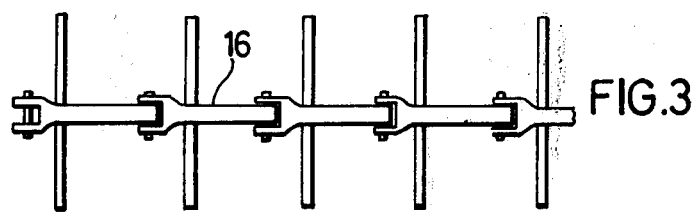
FIG. 3 is a fragmentary top-plan view showing a portion of a drag chain as used in the conveyor of FIG. 1.

Referring to FIGS. 1 and 2A in particular, it will be seen that the reference numeral 1 identifies a drag-chain conveyor which is intended to transport coal or coke from a non-illustrated source of supply to a plurality of oven chambers of a furnace battery, the upper wall or ceiling of which is fragmentarily shown and identified with reference character C. A plurality of charging holes H are provided (one shown) which are spaced from one another in the longitudinal direction of the battery of ovens, and all of which are to be serviced by the drag-chain conveyor 1. Conveyors of this type use a channel or tunnel which forms a passage 1c bounded by a bottom wall 1a provided with a plurality (one shown) of openings 2 that are spaced longitudinally of the conveyor 1. Such conveyors use conveyor chains made up of a plurality of chain links 1b, and a fragment of such a chain is shown in detail in FIG. 3. The direction of advancement is indicated by the arrow in FIG. 1.

As the crossbars of the links 1b scrape over the bottom wall 1a, they take along the coal or coke that is located between these crossbars, so that the coal or coke could, in the prior-art devices, drop into the individual outlet openings 2.

Arranged beneath the respective outlet openings 2, projecting downwardly from and securely connected with the bottom wall 1a, are discharge chutes 3 which in the illustrated embodiment (one shown) will be seen to be substantially funnel-shaped and to be asymmetric with reference to the outlet opening 2.

It should be understood that although the chute 3 is shown closely adjacent the ceiling C in FIG. 1, the actual distance bn36nen tqem 6rll ormrnarily bn on tqe order of 5 or 6 meters, and that the ceiling C will usually carry rails on which charging larries can travel from charging hole H to charging hole H. These charging larries are placed beneath the respective chutes 3 and receive a charge of coal or coke from them, which charge is then transferred to the respective charging hole H. Details of the arrangement of the charging holes H in the ceiling C, and of the use of the larries, may be ascertained by reference to "The Making, Shaping and Treatment of Steel,"published by the United States Steel Corporation, 1964.

According to the present invention the outlet opening 2 is bounded by a circumferentially extending marginal wall portion 5 of the bottom wall 1a which, as shown particularly clearly in FIG. 2A, is stepped so as to form a sharp edge or face 4 which of course again extends circumferentially. A closure plate 6 is provided which is movable between one position (shown in full lines) in which it closes the opening 2 and is flush with the upwardly directed surface of the bottom wall 1a, and a second position (shown in broken lines) in which it unblocks the opening 2. As shown particularly clearly in FIG. 2A, the closure plate 6 is provided with a circumferentially extending bevelled face 7 which, when the plate 2 is in the closure position, engages the edge or face 4 to provide a seal therewith.

The plate 6 is mounted on one or more lever arms 8 (one shown) which in turn are mounted on a shaft 9 for pivotal displacement between the indicated positions. The shaft 9 can be turned by the diagrammatically illustrated crank. The free end portion of the arm 8, on which the plate 6 is mounted, is provided with abutments 10 which are so dimensioned that the plate 6 can tilt very slightly and within a precisely predetermined range with respect to the arm 8, when it enters the opening 2. This small amount of play permits plate 6 to become properly seated in the opening 2, so that the faces 4 and 7 together provide a seal.

Figure 2B:
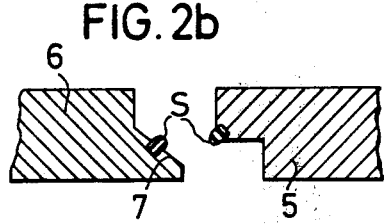
FIG. 2b is a view similar to FIG. 2a, showing a further feature.

It is advantageous, but not necessary according to the invention, that the faces 4 and 7 be provided with elastically yieldable sealing strips S (see FIG. 2b) which further improve the quality of the seal. Of course, only the face 4 could be provided for such a sealing strip, or only the face 7 could be provided for such a sealing strip, if that is desired. The sealing strips are designated with reference character S in FIG. 2b.

The cooperation of the inclined movable bevelled sealing face 7 and the stationary sharp sealing edge or face 4 assures a reliable operation under all circumstances. In particular, since the plate 6 is flush with the upper surface of the bottom wall 1a when in closure position, no coal or coke can fall into the opening 2, so that the coal that is being advanced by the chain links 1b will simply slide over the juncture between the wall 1a and the plate 6, without causing any problems. Moreover, the engagement of the sharp edge 4 with the bevelled face 7 provides for a reliable seal because caking of coal dust and the like can no longer take place, which would otherwise prevent proper sealing action. This means that if pressure differences of a few millimeters water column exist between the passage 1c and the interior of the discharge chute 3, the arrangement will reliably operate to provide a seal against the passage of dust and gases.

Moreover, the arrangement according to the present invention eliminates the need for the slidable closure plates which heretofore were either located in the outlet portion of the discharge chute 3, or beneath the lower open end of the chute.

It will be appreciated that while the invention has been described with respect to a conveyor for conveying coal or coke to ovens of industrial furnaces, it is clear that the invention could be incorporated in a drag-chain conveyor which conveys other materials, for instance grain or the like, since the concept and principle of the present invention would remain unchanged.

It will be understood that each of the elements described above, or two or more together, may also find a useful application in other types of applications differing from the types described above.

While the invention has been illustrated and described as embodied in a drag-chain conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a drag-chain conveyor, particularly of the type used in conveying coal in pre-heated condition, a combination comprising wall means defining an elongated passage having a bottom wall formed with an opening which is bounded by a circumferentially extending marginal wall portion of stepped cross-section having an annular contact face; a discharge chute extending downwardly from said bottom wall and communicating with said opening; a closure plate for said opening and being movable between a first position in which it is withdrawn from said opening and a second position in which it is located in and closes said opening, said closure plate having a circumferentially extending bevelled edge face, said wall means, discharge chute and closure plate all being subject to heating by heat energy transferred from the coal in pre-heated condition; means on at least one of said faces for gas-tightly and dust-tightly sealing said opening in said bottom wall of said passage, said sealing means including elastically-yielding, heat-resisting strip means located intermediate said faces and effective for making at least line contact engagement between the latter when said closure plate is in said second position; and mounting means mounting said closure plate for movement between said first and second positions.

2. A combination as defined in claim 1, wherein said discharge chute is funnel-shaped.

3. A combination as defined in claim 1, wherein the configuration of said discharge chute is funnel-shaped and asymmetric with reference to said opening.

4. A combination as defined in claim 1, wherein said closure plate is flush with an upper surface of said bottom wall when said closure plate is in said second position.

5. A combination as defined in claim 1, wherein said mounting means comprises a mounting arm carrying said closure plate and being turnable about an axis, and an actuating member for turning said mounting arm.

6. A combination as defined in claim 5, wherein said actuating member is a crank member.

7. A combination as defined in claim 5, wherein said mounting arm has pivotable abutment means which carry said closure plate, said abutment means being operative for slightly tilting said closure plate with respect to said mounting arm when said closure plate is in said second position, whereby the slight tilting of said closure plate permits the same to be properly seated in said opening.

* * * * *

UNITED STATES PATENT AND TRADEMARK OFFICE
CERTIFICATE OF CORRECTION

PATENT NO. : 3,972,415

DATED : August 3, 1976

INVENTOR(S) : Wolfgang Rohde

It is certified that error appears in the above—identified patent and that said Letters Patent are hereby corrected as shown below:

On the Title page

In the heading, the name and address of the second assignee should be added, and read -- Didier Engineering GmbH, Essen, Germany --.

Signed and Sealed this

Twenty-first Day of September 1982

[SEAL]

Attest:

Attesting Officer

GERALD J. MOSSINGHOFF

Commissioner of Patents and Trademarks